(12) United States Patent
Sundaresan

(10) Patent No.: US 11,394,774 B2
(45) Date of Patent: Jul. 19, 2022

(54) SYSTEM AND METHOD OF CERTIFICATION FOR INCREMENTAL TRAINING OF MACHINE LEARNING MODELS AT EDGE DEVICES IN A PEER TO PEER NETWORK

(71) Applicant: swarmin.ai, Fremont, CA (US)

(72) Inventor: Subash Sundaresan, Fremont, CA (US)

(73) Assignee: Subash Sundaresan, Fremont, CA (US)

( * ) Notice: Subject to any disclaimer, the term of this patent is extended or adjusted under 35 U.S.C. 154(b) by 0 days.

(21) Appl. No.: 16/953,132

(22) Filed: Nov. 19, 2020

(65) Prior Publication Data

US 2021/0250401 A1    Aug. 12, 2021

Related U.S. Application Data

(60) Provisional application No. 62/972,590, filed on Feb. 10, 2020.

(51) Int. Cl.
| | |
|---|---|
| *G06F 15/173* | (2006.01) |
| *H04L 67/104* | (2022.01) |
| *G06K 9/62* | (2022.01) |
| *G06N 20/00* | (2019.01) |
| *H04L 67/1087* | (2022.01) |

(52) U.S. Cl.
CPC ........ *H04L 67/1044* (2013.01); *G06K 9/6256* (2013.01); *G06N 20/00* (2019.01); *H04L 67/1059* (2013.01); *H04L 67/1091* (2013.01)

(58) Field of Classification Search
CPC ............. H04L 67/1044; H04L 67/1059; H04L 67/1091; G06N 20/00; G06K 9/6256

USPC ............... 709/224; 706/48, 52, 12; 455/411; 382/133

See application file for complete search history.

(56) References Cited

U.S. PATENT DOCUMENTS

| | | | | |
|---|---|---|---|---|
| 10,223,601 | B1 * | 3/2019 | Huang | G06V 20/582 |
| 11,176,495 | B1 * | 11/2021 | Ron | G06Q 30/016 |
| 2003/0172043 | A1 * | 9/2003 | Guyon | G06N 20/10 |
| | | | | 706/48 |
| 2004/0123104 | A1 * | 6/2004 | Boyen | G06F 21/602 |
| | | | | 713/165 |
| 2007/0118494 | A1 * | 5/2007 | Jannarone | G06K 9/6202 |
| | | | | 706/52 |

(Continued)

FOREIGN PATENT DOCUMENTS

CN    110175677 A  *  8/2019

*Primary Examiner* — Thuong Nguyen

(57) ABSTRACT

There is provided a method of operating a certifying node to certify incremental trained machine learning (ML) models of one or more edge devices associated with a peer to peer network. The method includes (i) generating a predictive outcome value for a test data set by executing a candidate ML model against the test data set available to the certifying node; (ii) determine a measure of quality of the candidate ML model by matching the predictive outcome value of the candidate ML model with an actual outcome value of the test data set; and (iii) certify the candidate ML model by comparing the measure of quality of the candidate ML model against a threshold error value, for use in real time incremental training by the one or more edge devices of the peer to peer network.

16 Claims, 9 Drawing Sheets

(56) References Cited

U.S. PATENT DOCUMENTS

| | | | | |
|---|---|---|---|---|
| 2010/0216430 A1* | 8/2010 | Brown | | H04L 67/24 |
| | | | | 455/411 |
| 2012/0116850 A1* | 5/2012 | Abe | | G06Q 10/067 |
| | | | | 705/7.38 |
| 2014/0279753 A1* | 9/2014 | Dalessandro | | G06N 5/02 |
| | | | | 706/12 |
| 2015/0302237 A1* | 10/2015 | Ohya | | G06T 7/62 |
| | | | | 382/133 |
| 2016/0103901 A1* | 4/2016 | Kadav | | G06F 16/1837 |
| | | | | 707/614 |
| 2016/0321563 A1* | 11/2016 | Sinha | | G06N 3/008 |
| 2016/0358099 A1* | 12/2016 | Sturlaugson | | G06N 5/043 |
| 2018/0052804 A1* | 2/2018 | Mikami | | G06N 7/005 |
| 2018/0144042 A1* | 5/2018 | Sheng | | G06N 20/20 |
| 2018/0341898 A1* | 11/2018 | Bose | | G06Q 30/0202 |
| 2019/0018067 A1* | 1/2019 | Kong | | H01M 8/04992 |
| 2019/0122078 A1* | 4/2019 | Ura | | G06F 16/906 |
| 2019/0197435 A1* | 6/2019 | Kobayashi | | G06N 20/00 |
| 2019/0295722 A1* | 9/2019 | Abramoff | | G06N 20/10 |
| 2019/0332977 A1* | 10/2019 | Ishiguro | | G06Q 10/04 |
| 2019/0378180 A1* | 12/2019 | Endras | | G06N 20/00 |
| 2019/0385043 A1* | 12/2019 | Choudhary | | G06N 3/084 |
| 2020/0081817 A1* | 3/2020 | Gross | | G06K 9/6298 |
| 2020/0142735 A1* | 5/2020 | Maciocco | | G06F 16/90339 |
| 2020/0150159 A1* | 5/2020 | Takeda | | G01M 99/00 |
| 2020/0167202 A1* | 5/2020 | Huang | | G05B 13/0265 |
| 2020/0210883 A1* | 7/2020 | Al-Omari | | G06F 16/24542 |
| 2020/0265301 A1* | 8/2020 | Burger | | G06N 3/0481 |
| 2020/0314614 A1* | 10/2020 | Moustafa | | H04L 63/08 |
| 2020/0394563 A1* | 12/2020 | Kokubo | | G06K 9/628 |
| 2020/0394813 A1* | 12/2020 | Theverapperuma | | E02F 3/437 |
| 2021/0018655 A1* | 1/2021 | Sun | | G01V 99/005 |
| 2021/0103580 A1* | 4/2021 | Schierz | | G06N 20/20 |
| 2021/0103876 A1* | 4/2021 | Petrosso | | G06F 40/56 |
| 2021/0110288 A1* | 4/2021 | Poothiyot | | G06F 8/20 |
| 2021/0133558 A1* | 5/2021 | Arya | | G06N 3/08 |
| 2021/0209512 A1* | 7/2021 | Gaddam | | G06N 20/10 |
| 2021/0350273 A1* | 11/2021 | Huu | | G06N 20/20 |

\* cited by examiner

GENERATE A PREDICTIVE OUTCOME VALUE FOR A TEST DATA SET BY EXECUTING A CANDIDATE MACHINE LEARNING MODEL AGAINST THE TEST DATA SET AVAILABLE TO THE CERTIFYING NODE, THE CANDIDATE MACHINE LEARNING MODEL BEING RECEIVED FROM A FIRST EDGE DEVICE AFTER THE FIRST EDGE DEVICE IS REGISTERED WITH THE CERTIFYING NODE

602

DETERMINE A MEASURE OF QUALITY OF THE CANDIDATE MACHINE LEARNING MODEL BY MATCHING THE PREDICTIVE OUTCOME VALUE OF THE CANDIDATE MACHINE LEARNING MODEL WITH AN ACTUAL OUTCOME VALUE OF THE TEST DATA SET

604

CERTIFY THE CANDIDATE MACHINE LEARNING MODEL BY COMPARING THE MEASURE OF QUALITY OF THE CANDIDATE MACHINE LEARNING MODEL AGAINST A THRESHOLD ERROR VALUE, FOR USE IN REAL TIME INCREMENTAL TRAINING BY THE ONE OR MORE EDGE DEVICES IN THE PEER TO PEER NETWORK

SYSTEM AND METHOD OF CERTIFICATION FOR INCREMENTAL TRAINING OF MACHINE LEARNING MODELS AT EDGE DEVICES IN A PEER TO PEER NETWORK

CROSS-REFERENCE TO RELATED APPLICATIONS

This patent application claims priority to U.S. provisional patent application No. 62/972,590 filed on Feb. 10, 2020 and is related to U.S. provisional patent application No. 62/972,580 filed on Feb. 10, 2020, U.S. provisional patent application No. 62/965,099 filed on Jan. 23, 2020, U.S. provisional patent application No. 62/978,277 filed on Feb. 18, 2020, U.S. provisional patent application No. 62/978,280 filed on Feb. 18, 2020, the complete disclosures of which, in their entirety, are hereby incorporated by reference.

BACKGROUND

Technical Field

Embodiments of this disclosure generally relate to training machine learning model, and more particularly, to systems and methods of certification for incremental training of machine learning models at edge devices in a peer to peer network.

Description of the Related Art

Machine learning techniques are typically used to build a model or a rule set to predict a result based on values of one or more features. Machine learning techniques typically involve use of a data set that includes, for each record, a value for each of a set of features, and a result. A model or rule set for predicting the result is developed based on the data set. Machine learning techniques generally build on statistical underpinnings. Statistical approaches test a proposed model against a set of data. Machine learning techniques search through a space of possible models, to find the best model to fit a given set of data used for various commonly seen use cases such as personalization of user experiences, recommendation of products, medical diagnosis, and the like.

Typically, machine learning techniques follow a data flow architecture that involves sending data from usage of relevant applications or websites by end users of edge devices to a central server, where the edge devices may include devices such as smartphones, tablets, computers, smart watches, internet of things (IoT) devices, connected vehicles, and the like. The server aggregates all the data gathered from the edge devices and uses the data to train a machine learning (ML) model. The trained ML model is subsequently used for decisioning, such as for example personalization or product recommendations, medical diagnosis and the like. An example of a typical network environment 100 for machine learning is depicted in FIG. 1. Typically, data associated with one or more users 104A-N, including for example, data associated with usage of applications or websites is transferred to a server 108 via a network 106. The server 108 aggregates all the data received and a machine learning (ML) model is trained at the server 108 based on the aggregated data. The trained ML model is subsequently used for decisioning for various technical purposes, such as for example, for personalization of user experience, for providing product recommendations, medical diagnosis, and the like.

However, the conventional machine learning techniques have several key problems. For instance, sending user data to the server 108 may cause privacy concerns and/or security issues, since the user data may be shared with third parties without their permission, or could be used for purposes for which the user has not provided permission. Further, the user data on such the server 108 may be hacked by malicious actors, thereby causing data leaks. The user data may include sensitive data of the user such as their health or financial records, or their location data, among many others. Due to the above privacy and data security concerns, many users of applications and websites are reluctant to send such valuable data to the server 108, thereby potentially denying the benefits that ML models based on that data can provide to end users, for example, being able to diagnose diseases based on medical data signals. Such an ML architecture is slow learning, as the aggregation of data and updating of the training of the models is done periodically (say, once or twice per day) and not in a continuous manner. Additionally, the ML model generated based on known training techniques typically constitutes large file sizes imposing significant load on the network on being repeatedly transmitted to the server 108.

Accordingly, there remains a need for a system and method for efficient training of machine learning (ML) models without sharing user data with a server that ensures privacy of user data and enables training of the ML models without any un authorized interference from third party devices.

SUMMARY

In view of the foregoing, an embodiment herein provides a certifying node for certifying an incrementally trained machine learning (ML) model. The certifying node is configured to be communicatively connected with one or more edge devices in a peer to peer network. The certifying node is configured to (i) generate a predictive outcome value for a test data set by executing a candidate ML model against the test data set available to the certifying node, (ii) determine a measure of quality of the candidate ML model by matching the predictive outcome value of the candidate ML model with an actual outcome value of the test data set, and (iii) certify the candidate ML model by comparing the measure of quality of the candidate ML model against a threshold error value, for use in real time incremental training by the one or more edge devices in the peer to peer network. The candidate ML model is received from a first edge device after the first edge device is registered with the certifying node.

In some embodiments, the candidate ML model is an incrementally trained machine learning model.

In some embodiments, the certifying node is further configured to receive a registration request from the first edge device to register the first edge device to the certifying node and thereafter to provide an encrypted key to the first edge device to authenticate subsequent requests from the first edge device.

In some embodiments, the certifying node is further configured to verify that each data updated to the candidate ML model is layered on top of a last certified ML model based on an encrypted data that specifies a base model version from which the candidate ML model is derived, to avoid overwriting of the last certified ML model by the first edge device.

In some embodiments, the first edge device incrementally trains the last certified ML model using an event data upon occurrence of an event at the first edge device to generate the candidate ML model.

In some embodiments, the first edge device generates a base version of a machine learning model for incremental training if there is no last certified ML model.

In some embodiments, the candidate ML model includes one or more parameters and one or more weights associated with the one or more parameters. The candidate ML model may be devoid of the event data that is used to generate the candidate ML model.

In some embodiments, the certifying node is further configured to transmit a certified ML model to at least one of the first edge device or the other edge devices of the peer to peer network for use in the real time incremental training of the certified ML model or for use in real-time decision making at the one or more edge devices.

In some embodiments, the certifying node determines the measure of quality of the candidate ML model by (i) comparing the predictive outcome value of the candidate ML model for the test data set with the actual outcome value of the test data set, (ii) squaring a difference between the predictive outcome value and the actual outcome value, (iii) averaging squared values, and (iv) computing a square root of averaged squared values as Root Mean Square Error (RMSE) for enabling the certification of the candidate ML model.

In some embodiments, the certifying node certifies the candidate ML model if the RMSE is below the threshold error value and monotonic decreasing or remains constant.

In some embodiments, the certifying node is further configured to maintain a record of a number of data points that is used by each of the one or more edge devices for incrementally training the candidate ML model to prevent undue contribution by each of the one or more edge devices for incremental training of the candidate ML model.

In one aspect, there is provided a method of operating a certifying node for certifying an incrementally trained machine learning (ML) model. The certifying node is configured to be communicatively connected with one or more edge devices in a peer to peer network. The method includes configuring the certifying node to (i) generate a predictive outcome value for a test data set by executing a candidate ML model against the test data set available to the certifying node, (ii) determine a measure of quality of the candidate ML model by matching the predictive outcome value of the candidate ML model with an actual outcome value of the test data set, and (iii) certify the candidate ML model by comparing the measure of quality of the candidate ML model against a threshold error value, for use in real time incremental training by the one or more edge devices in the peer to peer network. The candidate ML model is received from a first edge device after the first edge device is registered with the certifying node.

In some embodiments, the method further includes configuring the certifying node to verify that each data updated to the candidate ML model is layered on top of a last certified ML model based on an encrypted data that specifies a base model version from which the candidate ML model is derived, to avoid overwriting of the last certified ML model by the first edge device.

In some embodiments, the first edge device incrementally trains the last certified ML model using an event data upon occurrence of an event at the first edge device to generate the candidate machine learning model. The first edge device may generate a base version of a ML model for incremental training if there is no last certified ML model.

In some embodiments, the candidate ML model includes one or more parameters and one or more weights associated with the one or more parameters. The candidate ML model may be devoid of the event data that is used to generate the candidate ML model.

In some embodiments, the method further includes configuring the certifying node to transmit a certified ML model to at least one of the first edge device or the other edge devices of the peer to peer network for use in the real time incremental training of the certified ML model or for use in real-time decision making at the one or more edge devices.

In some embodiments, the certifying node determines the measure of quality of the candidate ML model by (i) comparing the predictive outcome value of the candidate ML model for the test data set with the actual outcome value of the test data set, (ii) squaring a difference between the predictive outcome value and the actual outcome value, (iii) averaging squared values, and (iv) computing a square root of averaged squared values as Root Mean Square Error (RMSE) for enabling the certification of the candidate ML model.

In some embodiments, the certifying node certifies the candidate ML model if the RMSE is below the threshold error value and monotonically decreasing or remains constant.

In some embodiments, the method further includes configuring the certifying node to maintain a record of a number of data points that is used by each of the one or more edge devices for incrementally training the candidate machine learning model to prevent undue contribution by each of the one or more edge devices for incremental training of the candidate machine learning model.

In another aspect, there is provided a computer program product including a non-transitory computer-readable storage medium having computer-readable instructions stored thereon, computer-readable instructions being executable by a computerized device including processing hardware to execute a method of operating a certifying node for certifying an incrementally trained machine learning model. The certifying node is configured to be communicatively connected with one or more edge devices of a peer to peer network. The method includes configuring the certifying node to (i) generate a predictive outcome value for a test data set by executing a candidate machine learning model against the test data set available to the certifying node, (ii) determine a measure of quality of the candidate machine learning model by matching the predictive outcome value of the candidate machine learning model with an actual outcome value of the test data set, and (iii) certify the candidate machine learning model by comparing the measure of quality of the candidate machine learning model against a threshold error value, for use in real time incremental training by the one or more edge devices in the peer to peer network. The candidate machine learning model is received from a first edge device after the first edge device is registered with the certifying node.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flow chart that illustrates a method of operating a certifying node for certifying an incrementally trained machine learning (ML) model, in accordance with the embodiments herein.

DETAILED DESCRIPTION OF PREFERRED EMBODIMENTS

Figure 1:
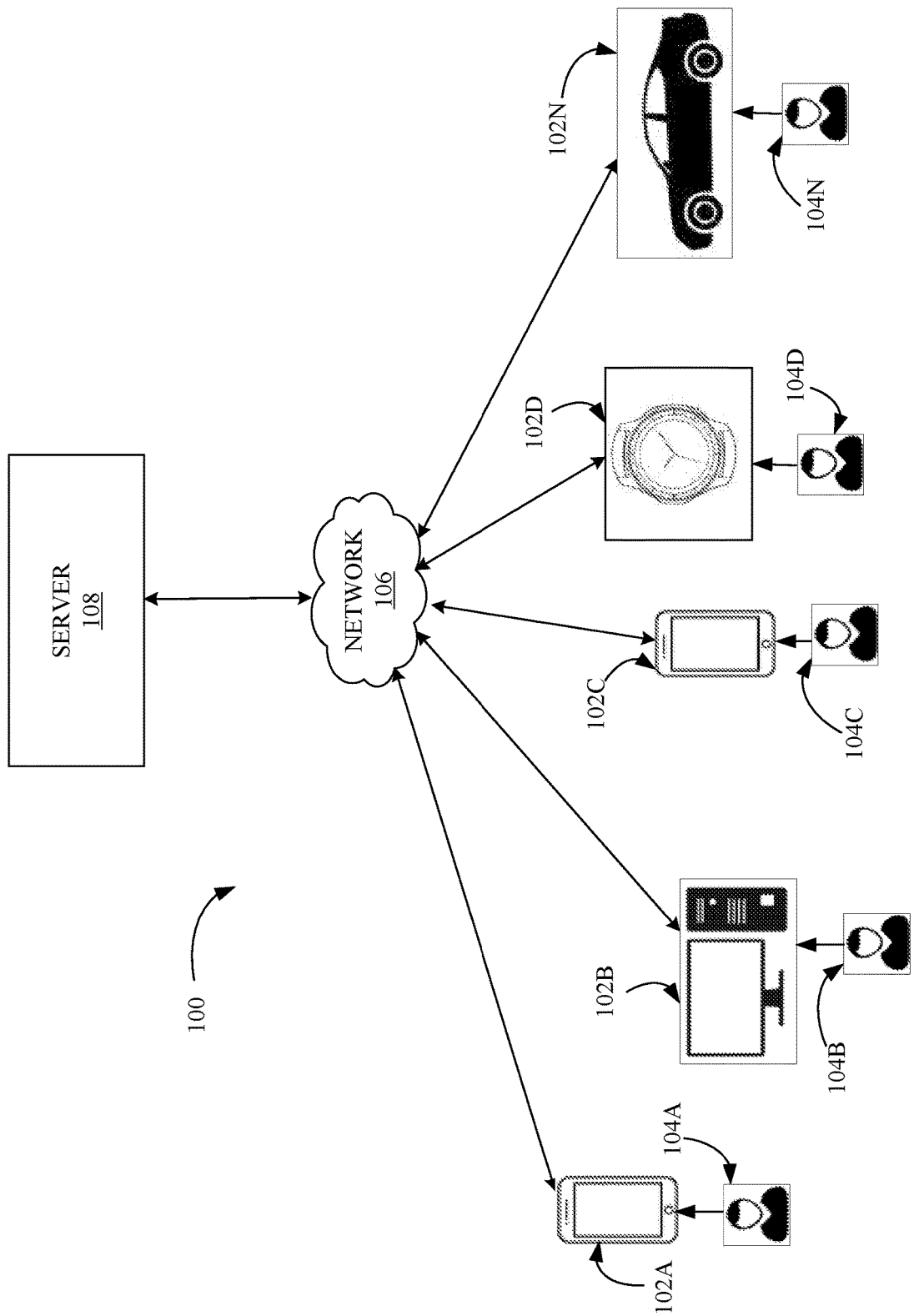
FIG. 1 depicts a network architecture for machine learning on a server.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains need for a system and method for efficient training of machine learning (ML) models without sharing user data with a server that ensures privacy of user data and enables training of the ML models without any unauthorized interference from third party devices. The embodiments herein achieve this by proposing a system and a method for certification for incremental training of ML models at edge devices in a peer to peer network. Referring now to the drawings, and more particularly to FIGS. 2 through 7, where similar reference characters denote corresponding features consistently throughout the figures, there are shown preferred embodiments.

As used herein the term "ML model" may refer to a mathematical representation of a real-world training process, in which a learning algorithm may be configured to find patterns in a training data such that one or more input parameters correspond to a target and an output of the training process is an ML model that may be subsequently used to make one or more predictions. The term "machine learning process" as used herein may refer to a process that tunes one or more parameters to be simultaneously optimal on a training dataset using one or more machines.

Figure 2:
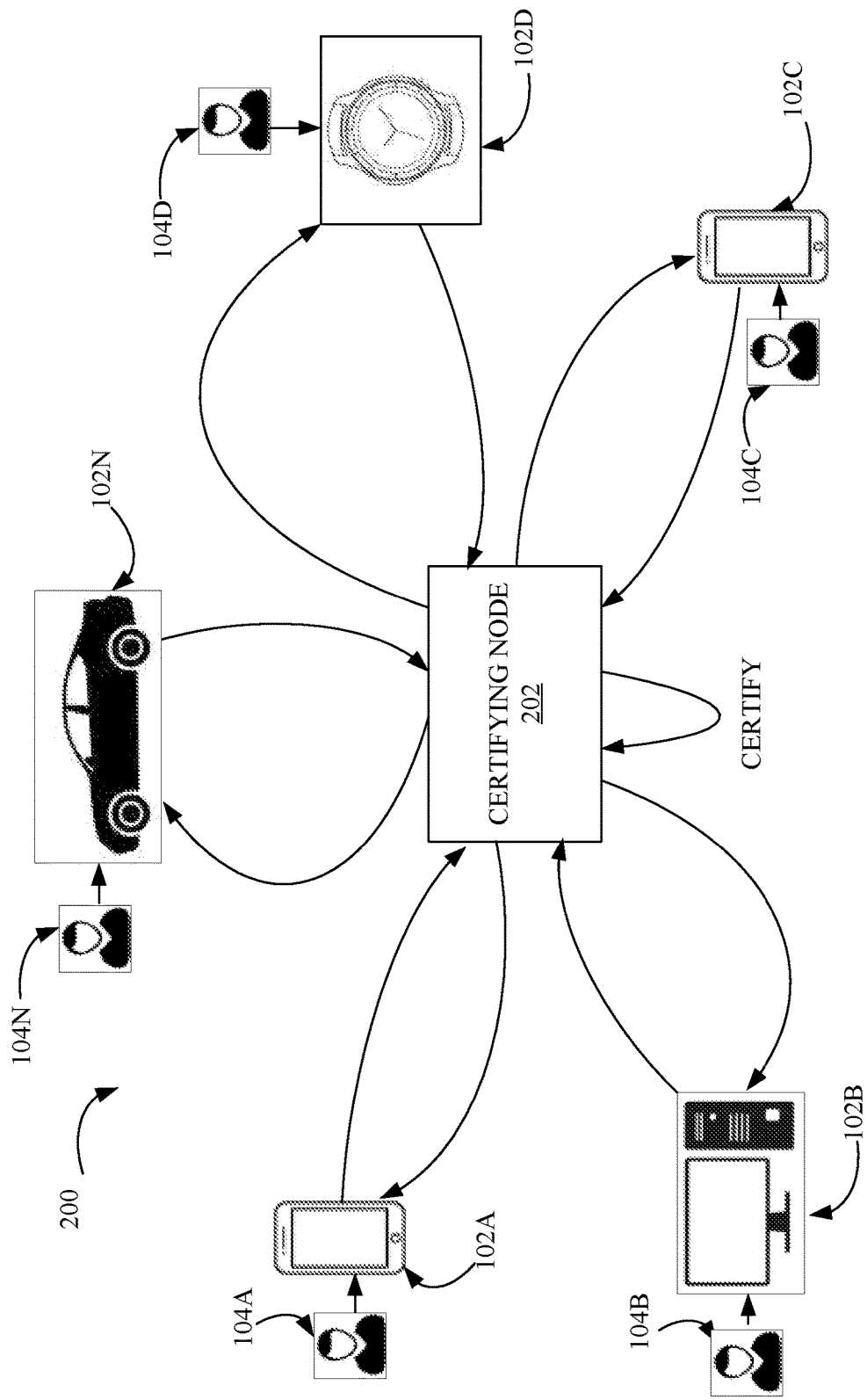
FIG. 2 illustrates a peer to peer network of devices configured to perform certification for incremental training of machine learning (ML) models at one or more edge devices associated with a peer to peer network, in accordance with the embodiments herein.

FIG. 2 illustrates a peer to peer network of devices 200 configured to perform certification for incremental training of machine learning (ML) models at one or more edge devices 102A-N associated with a peer to peer network, in accordance with the embodiments herein. The peer to peer network of devices 200 includes the one or more edge devices 102A-N that are associated with one or more users 104A-N, and a certifying node 202. The one or more edge devices 102A-N are communicatively associated with each other through the peer to peer network. In various embodiments, the peer to peer network may include a single network or a combination of different networks. Examples of the peer to peer network of devices 200 may include but are not limited to, a local area network (LAN), a wide area network (WAN), a public network, a private network, a proprietary network, a Public Telephone Switched Network (PSTN), the Internet, a wireless network, a virtual network, or any combination thereof. Examples of the one or more edge devices 102A-N include, but not limited to, smartphones, tablets, computers, smart watches, internet of things (IOT) devices, connected vehicles, and the like. In some embodiments, the one or more edge devices 102A-N may also include various network access points, such as, wired or wireless access points including base stations, internet exchange points or any other type of entity having computation and networking capabilities.

The certifying node 202 may be communicatively coupled with the one or more edge devices 102A-N to regulate a process of incremental training of one or more ML models. In an embodiment, the certifying node 202 may be configured to enable registration of the one or more edge devices 102A-N with the peer to peer network of devices 200. In an embodiment, the certifying node 202 receives registration requests from each of the one or more edge devices 102A-N while joining the peer to peer network, thereafter registers each of the one or more edge devices 102A-N with the certifying node 202, and provides an encrypted key for each of the one or more edge devices 102A-N to authenticate any subsequent requests from the one or more edge devices 102A-N. In some embodiments, the certifying node 202 evaluates legitimacy of each of the one or more edge devices 102A-N while joining the peer to peer network, and if deemed okay, the certifying node 202 registers each of the one or more edge devices 102A-N with the certifying node 202, and provides the encrypted key for each of the one or more edge devices 102A-N. The encrypted key for each of the one or more edge devices 102A-N serves as proof of authenticity of each of the one or more edge devices 102A-N in any subsequent interactions and prevents tampering in one or more subsequent interactions with the respective edge device. In some embodiments, the certifying node 202 uses one or more edge device identifiers and the like for evaluating the legitimacy of each of the one or more edge devices 102A-N.

In an embodiment, each of the one or more edge devices 102A-N registered with the peer to peer network of devices 200 may receive a base version of an ML model. In an embodiment, the base version of the ML model may be generated by each of the one or more edge devices 102A-N using an authorized program. The base version of the ML model is generated using traditional machine learning algorithms (such as linear regression or logistic regression or neural net) applied to a dataset of one or more data points. A different between the base version of the ML model and subsequent versions of the ML model is that the base version starts without a previously trained model as its basis. The base version may be generated on the one or more edge devices 102A-N, or on a server, and then pushed to the one or more edge devices 102A-N.

In an embodiment, the ML model may include one or more parameters and one or more weights associated with the one or more parameters. Examples of the one or more parameters may include, but are not limited to, gender, age, location, category of a content on a website or an application, and the like. The one or more weights indicate an amount of importance the respective parameters are given in decisions made by the ML model. For example, gender may have a weight of 0.4, while age may have a weight of 0.3. Upon occurrence of a event data at any of the one or more edge devices 102A-N, the base version of the ML model is incrementally trained by the respective edge device. The event data may include, for example data associated with user inputs to particular applications, such as for example usage of the relevant application or a website by end users (such as user 108).

In an embodiment, each of the one or more edge devices 102A-N incrementally trains the base version of the ML model upon occurrence of the event data at the respective edge device. The incremental training is performed by updating the one or more weights associated with the one or more parameters of the ML model during a predetermined window of time. The predetermined window of time may include, for example, one individual event or a short batch of events. In an embodiment, the predetermined window of time may be configurable. The incrementally trained ML models may be subsequently used for decisioning, for example for personalization or product recommendations or medical diagnosis. In an embodiment, the updates are applied in real-time on receipt of the event data. The incremental training of the ML models enables machine learning to happen in real-time, as soon as the event data occurs on the one or more edge devices 102A-N thereby improving a quality of the decisions made by the ML model.

The ML model comprises learnings based on data previously seen by other edge devices in the peer to peer network of devices 200. In an embodiment, the learnings are devoid of an underlying event data used to generate an incrementally trained version of the ML model. During the incremental training process described herein, a previous version of the ML model may be used as the base version, or if no such previous version of the ML model is available, then the base version of the ML model may be generated. In various embodiments, the one or more edge devices 102A-N may receive the ML model including net learnings based on data previously seen by other edge devices in the peer-peer network of devices 200, but without their the underlying event data and such an ML model may constitute the previous, or base version of the ML model on which each edge device incrementally applies one or more training updates based on their respective event data.

The incrementally trained ML models may be used for various purposes, such as for example, sensitive health signals that are available to an application on a wearable device such as, a smart watch may be used to train ML models that may enable prediction of a user's probability of getting a disease, without being concerned about security or privacy issues associated with sending sensitive data to a server.

Subsequent to registration, the certifying node 202 receives a candidate ML model from each of registered edge devices 102A-N in the peer to peer network of devices 200. In an embodiment, the candidate machine learning model is an incrementally trained ML model. In an embodiment, the candidate ML model includes the one or more parameters and the one or more weights associated with the one or more parameters.

The certifying node 202 (i) generates a predictive outcome value for a test data set by executing the candidate ML model against the test data set available to the certifying node 202, and (ii) determines a measure of quality of the candidate ML model by matching the predictive outcome value of the candidate ML model with an actual outcome value of the test data set. The certifying node 202 may certify the candidate ML model if the predictive outcome value of candidate ML model on the test data set is within an acceptable margin of error when compared with predetermined results. The acceptable margin of error may be defined as (a) RMSE is less than or equal to the threshold error value, or (b) metrics such as precision and recall being above the threshold error value. For each of these, it is defined a minimum acceptable rate of improvement between successive versions. In some embodiments, the certifying node 202 determines the measure of quality of the candidate ML model by (a) comparing the predictive outcome value of the candidate ML model with the actual outcome value of the test data, (b) squaring a difference between the predictive outcome value and the actual outcome value so that positive and negative deltas are treated the same, (c) averaging squared values and (d) computing a square root of the average averaged squared values as Root Mean Square Error (RMSE) for enabling the certification of the candidate ML model. Other commonly used quality scores may be used precision or recall.

The certifying node 202 certifies the candidate machine learning model by comparing the measure of quality of the candidate ML model against a threshold error value, for use in real-time incremental training of a certified candidate ML model at the one or more edge devices 102A-N in the peer to peer network. The certifying node may certify the candidate ML model if the RMSE is below the threshold error value and monotonically decreasing or remains constant. In some embodiments, the certifying node 202 certifies the candidate ML model if the measure of quality is high. In some embodiments, the certified candidate machine learning model is used for real-time decision making at the one or more edge devices 102A-N in the peer to peer network. In some embodiments, the certifying node 202 transfers the candidate machine learning model to each of the one or more edge devices 102A-N in the peer to peer network for real-time incremental training as well as for real-time decision making.

If the RMSE on the predictive outcome value by the candidate ML model on the test data is low, the measure of quality is high and consequently the quality of the candidate ML model is high. Similarly, if the RMSE on the predictive outcome value by the candidate ML model on the test data is high, the measure of quality is low and consequently, the quality of the candidate ML model is low. Examples of the test data set may include, but is not limited to, (a) financial transactions data where the candidate ML model has to predict a probability that a given transaction is legitimate or fraudulent, (b) health data where a set of biometric input parameters may be used to predict a probability of a disease, or health condition, and the like.

In an exemplary embodiment, the incrementally trained ML model may be used to diagnose diseases. The certifying node 202 may have a test dataset that includes one or more input data, and an output data for the one or more input data for the diagnosis of the disease. The one or more input data may include patient data such as age, gender, and ethnicity, socio-economic data, risk factors such as obesity, high blood pressure and diabetes etc., laboratory data, or treatment data. The output data may include an actual outcome value for the diagnosis. The certifying node 202 may execute the candidate ML model against the one or more input data to generated a predictive outcome value for the diagnosis. (say, presence or absence of the disease, likelihood of being admitted to an ICU, or dying, etc.). Further, the certifying node 202 may compare the predictive outcome value for diagnosis with the actual outcome value for the diagnosis to determine the quality of the candidate ML model. The certifying node 202 may certify the candidate ML model if the measure of quality is high.

In another exemplary embodiment, the incrementally trained ML model may be used to predict which users in a mobile application or game may purchase in-app purchases (TAP). In such scenario, the measure of quality of the candidate ML model is determined by compare the predictive outcome value with the actual purchase amounts.

In some embodiments, the certified candidate ML model is further incrementally trained on any of one or more edge devices 102A-N by updating the one or more parameters and the one or weights associated with the one or more parameters upon occurrence of the event data at the respective edge device. The incremental training updates to the certified candidate ML model is layered upon certified candidate ML model. In some embodiments, the certifying node 202 ensures that each update to the candidate ML model is layered on top of the last certified ML model to avoid overwriting of previously certified ML model by the one or more edge devices 102A-N.

In some embodiments, the certifying node 202 maintains a record of a number of data points used by each edge device for incrementally training the candidate ML model to prevent undue contribution by each edge device in incremental training of the candidate ML model. In some embodiments, the certifying node 202 ensures that the candidate ML model originated from a legitimate edge device based on the encrypted key associated with the one or more edge devices 102A-N.

Figure 3A:
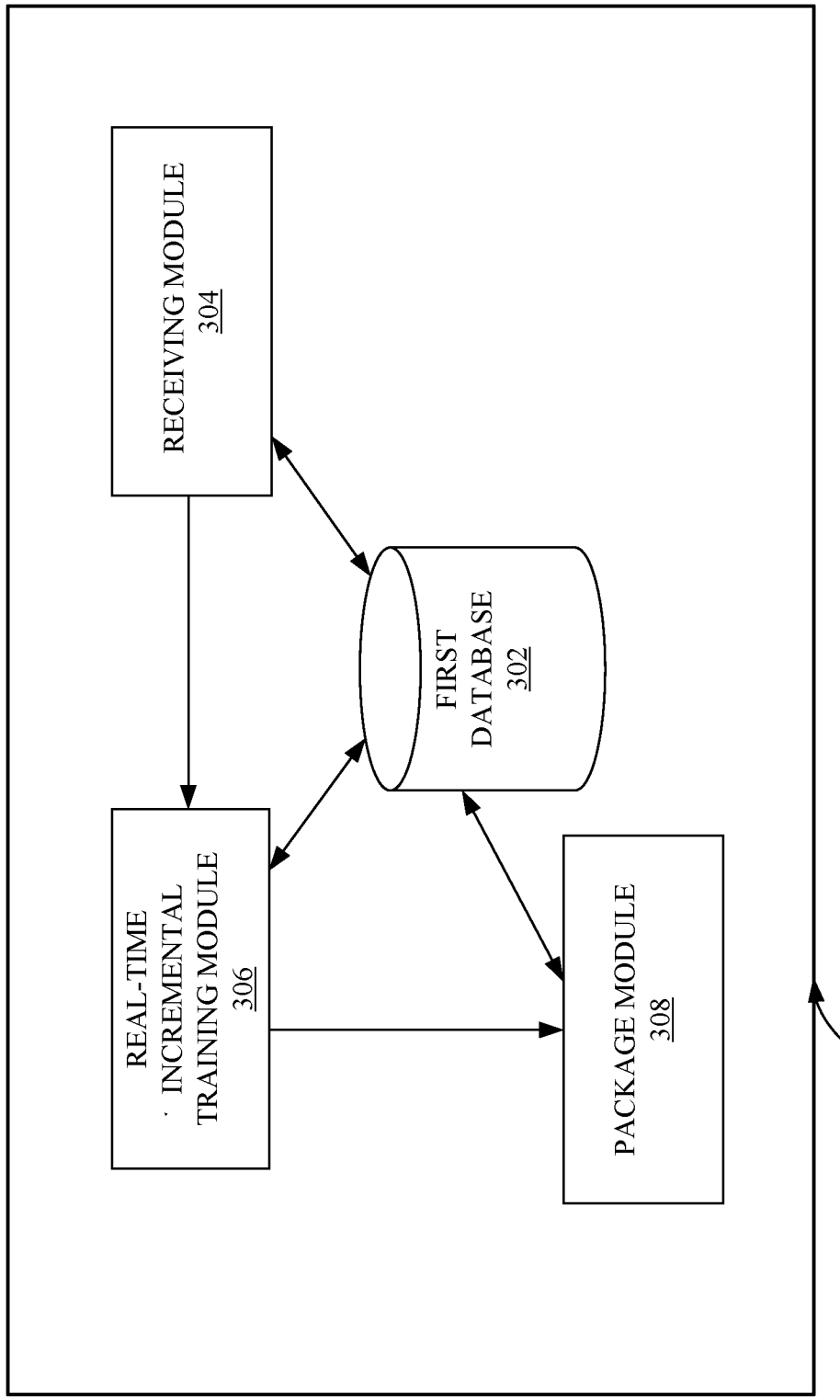
FIG. 3A illustrates a block diagram of an incremental training unit associated with an edge device of the peer to peer network of FIG. 2 for enabling certification for incremental training of the machine learning (ML) model at the edge device, in accordance with an embodiment herein.

FIG. 3A illustrates a block diagram of an incremental training unit 300 associated with an edge device of the peer to peer network of FIG. 2 for enabling certification for incremental training of the machine learning (ML) model at the edge device, in accordance with the embodiments herein. The incremental training unit 300 includes a receiving module 304, a real-time incremental training module 306, and a package module 308 that are communicatively associated with a first database 302. In various embodiments, the various modules of the incremental training unit 300 may be implemented as a software development kit (SDK) that may be configured to associate with one or more applications on the one or more edge devices 102A-N. The receiving module 304 is operable to generate the base version of the ML model on each of the one or more edge devices 102A-N using the authorized program. In an embodiment, the receiving module 304 generates the base version of the machine learning model comprising learning based on data previously seen by the one or more edge devices 102A-N in the peer to peer network by removing any underlying event data and retaining the one or more parameters and the one or more weights associated with the one or more parameters. In some embodiments, the receiving module 304 receives the base version of the ML model from the one or more edge devices 102A-N in the peer to peer network. The base version of the ML model may include the one or more parameters and the one or more weights associated with the one or more parameters. Examples of the one or more parameters may include, but is not limited to, gender, age, location, the category of the content on the website/application, and the like. The one or more weights indicate an amount of importance the respective parameters are given in the decisions made by the ML model. For example, gender may have a weight of 0.4, while age may have a weight of 0.3.

The real-time incremental training module 306 incrementally trains the base version of the ML model in real-time at each of the one or more edge devices 102A-N upon occurrence of the event data at the respective one or more edge devices 102A-N. The incremental training is performed by updating the one or more weights associated with the one or more parameters of the ML model during the predetermined window of time. The predetermined window of time may include, for example, one individual event or a short batch of events. In an embodiment, the predetermined window of time may be configurable. In an embodiment, the updates are applied in real-time on receipt of the event data. The ML model includes learnings based on data previously seen by other edge devices in the peer to peer network. In an embodiment, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used.

In some embodiments, the incremental training unit 300 may optionally include a ML model updating module (not shown in FIG. 3A) that is configured to update the ML model based on the updated weights received from the real-time incremental training of the ML model at other edge devices of the peer to peer network. During a first instance, the base version of the ML model available at the one or more edge devices 102A-N may be updated based on the updated weights and/or the one or more parameters received from the one or more other edge devices. The ML model updating module 308 may update the updated version of the ML model based on subsequent receipts of the one or more weights and/or the one or more parameters from the one or more other edge devices.

In an embodiment, the package module 308 is configured to pack and share the updated weights associated with the one or more parameters and/or the one or more parameters of the incrementally trained ML model from each edge device to the one or more other edge devices in the peer to peer network. In an embodiment, the one or more weights and/or the one or more parameters shared between the one or more edge devices 102A-N are devoid of any of the underlying event data that is used to generate the incremental version of the ML model thereby ensuring data security.

The real-time incremental training module 306 incrementally trains the updated machine learning model upon occurrence/receipt of the event data at each of the one or more edge devices 102A-N. For example, upon receiving a user selection of purchase items in an application in a mobile phone of a user, the user device incrementally trains the updated ML model based on the data associated with user selection.

Figure 3B:
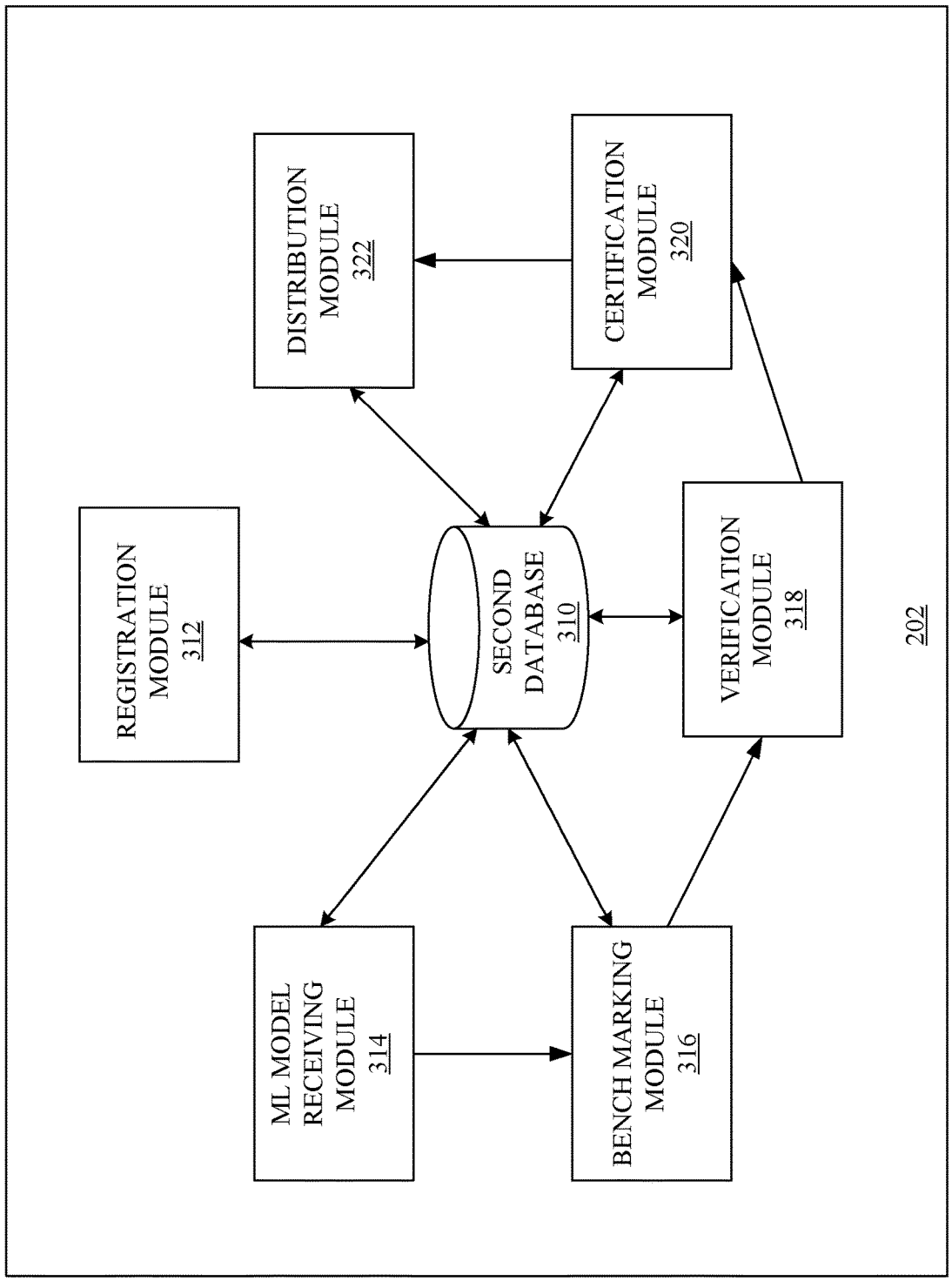
FIG. 3B illustrates a block diagram of a certification unit associated with a certifying node of the peer to peer network of devices of FIG. 2, for enabling certification for incremental training of ML models at the edge devices, in accordance with the embodiments herein.

FIG. 3B illustrates a block diagram of a certification unit 350 associated with the certifying node 202 of the peer to peer network of devices 200 of FIG. 2, for enabling certification for incremental training of ML models at the one or more edge devices 102A-N, in accordance with the embodiments herein. The certification unit 350 includes a registration module 312, a ML model receiving module 314, a bench marking module 316, a verification module 318, a certification module 320, and a distribution module 322. One or more modules in the certification unit 350 are associated with a second database 310. In some embodiments, the one or more modules in the certification unit 350 may be implemented as hardware components such as electronic chips, electronic circuits etc.

The registration module 312 receives registration requests from each of the one or more edge devices 102A-N for registering with the peer to peer network. The registration module 312 registers each of the one or more edge devices 102A-N with the certifying node 202, and provides the encrypted key for each of the one or more edge devices 102A-N to authenticate any subsequent requests from the one or more edge devices 102A-N.

The ML model receiving module 314 receives a candidate ML model from one or more registered edge device 102A-N in the peer to peer network over the network. In an embodiment, the candidate ML model is an incrementally trained machine learning model. In an embodiment, the candidate ML model includes the one or more parameters and the one or more weights associated with the one or more parameters.

The bench marking module 316 (i) generates the predictive outcome value for the test data set by executing the candidate ML model against the test data set available to the certifying node 202, and (ii) determines the measure of quality of the candidate ML model by matching the predictive outcome value of the candidate ML model with the actual outcome value of the test data set available to the certifying node 202. In some embodiments, the certification unit 350 determines the measure of quality of the candidate ML model by (a) comparing the predictive outcome value of the candidate machine learning model for the test data set with the actual outcome value for the test data, (b) squaring the difference between the predictive outcome value and the actual outcome value so that positive and negative deltas are treated the same, (c) averaging the squared values, and (d) computing the square root of the averaged squared values as the Root Mean Square Error (RMSE) for enabling certification of the candidate ML model.

The verification module 318 ensures each update to the candidate ML model is layered on top of the last certified machine learning model to avoid overwriting of previously certified machine learning model by the one or more edge devices 102A-N. The verification module 318 further maintains the record of the number of data points used by each edge device for incrementally training the candidate ML model to prevent undue contribution by each edge device in incremental training of the candidate ML model.

The certification module 320 certifies, upon verification, the candidate ML model if the RMSE is below the threshold error value and monotonically decreasing or remains constant, for use in real-time incremental training of the certified candidate ML model at the one or more edge devices 102A-N in the peer to peer network. In some embodiments, the certification module 320 certifies the candidate machine learning model if the measure of quality is high. For example, if the measure of quality value is high, the quality of the candidate ML model is high. Similarly, if the measure of quality is low, the quality of the candidate ML model is low. In some embodiments, the certified candidate ML model is used for real-time decision making at the one or more edge devices 102A-N in the peer to peer network. The distribution module 322 distributes the certified candidate ML model to the one or more edge devices 102A-N in the peer to peer network for real-time incremental training of the certified candidate ML model as well as for real-time decision making.

Figure 4:
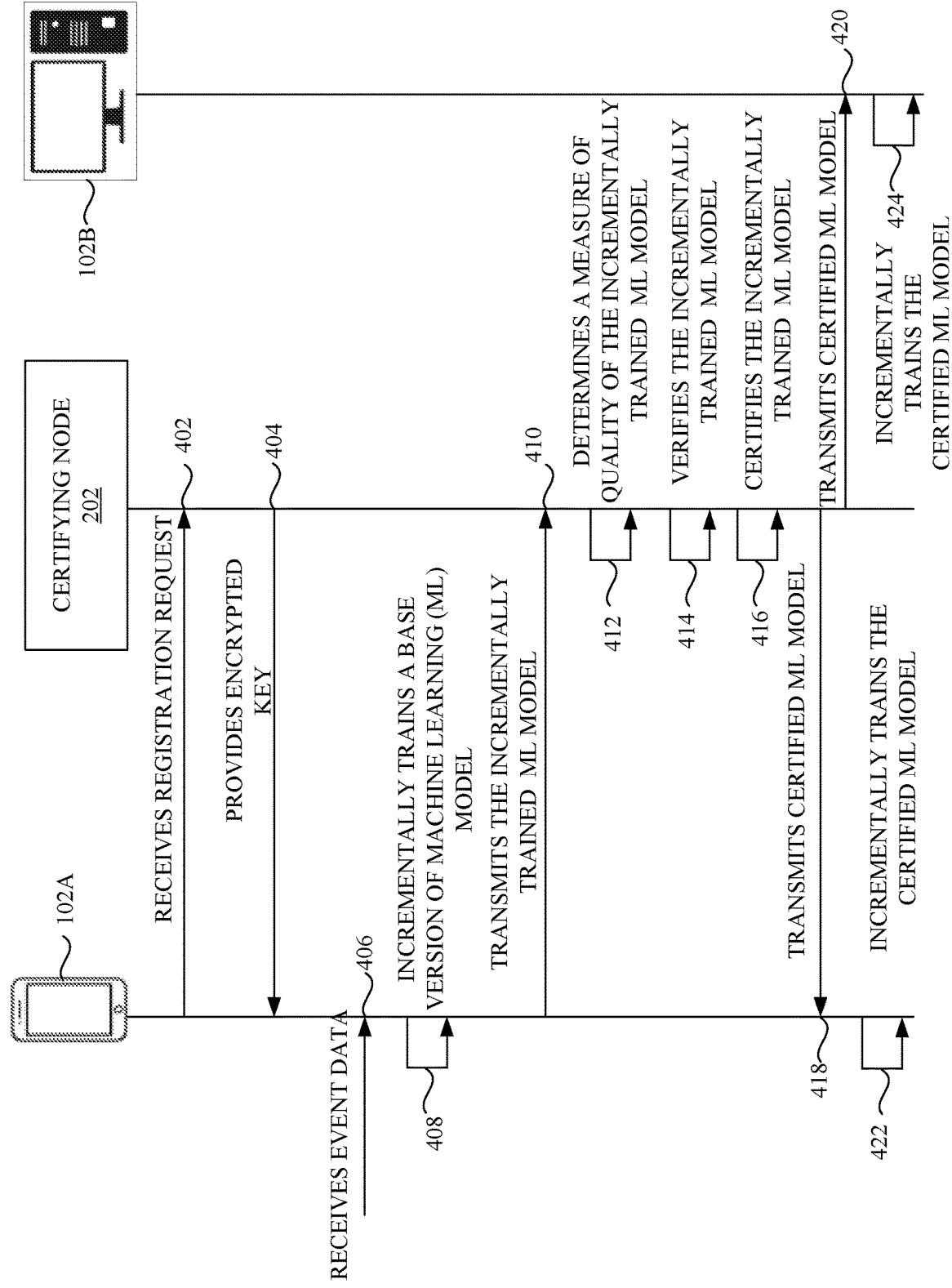
FIG. 4 is an interaction diagram that illustrates a method of certification for incremental training of machine learning (ML) models at a first edge device and a second edge device that are associated with the peer to peer network, according to some embodiments herein.

With reference to FIG. 1, FIG. 4 is an interaction diagram that illustrates a method of certification for incremental training of machine learning (ML) models at a first edge device 102A and a second edge device 102B that are associated with the peer to peer network, according to some embodiments herein. At a step 402, a registration request is received, by the certifying node 202, from the first edge device 102A of the peer to peer network. The certifying node 202 may be communicatively connected with the one or more edge devices 102A-N of the peer to peer network. At a step 404, the first edge device 102A of the peer to peer network is registered with the certifying node 202 by providing the encrypted key to the first edge device 102A. At step 406, the event data is received at the first edge device 102A of the peer to peer network upon occurrence of the event at the first edge device 102A. At a step 408, the base version of the machine learning (ML) model is incrementally trained at the first edge device 102A based on the received event data. At a step 410, the incrementally trained ML model is transmitted, by the first edge device 102A, to the certifying node 202.

At step 412, a measure of quality of the incrementally trained ML model is determined, at the certifying node 202, by matching a predictive outcome value of the incrementally trained ML model with an actual outcome value of the test data set. At step 414, incrementally trained ML model is verified by ensuring that each update is layered on top of the last certified ML model. At step 416, the incrementally trained ML model is certified upon verification, by the certifying node 202, by comparing the measure of quality of the incrementally trained ML model against a threshold error value. At step 418, the certified ML model is transmitted, by the certifying node 202, to the first edge device 102A. At step 420, the certified ML model is transmitted, by the certifying node 202, to the second edge device 102B. The certifying node 202 may transmit the certified ML model to the one or more edge devices 102A-N associated with the peer to peer network. At step 422, the certified ML model is incrementally trained in real-time by the first edge device 102A upon receiving a real-time event data. At step 424, the certified ML model is incrementally trained in real-time by the second edge device 102B upon receiving the real-time event data. The first edge device 102A and the second edge device 102B associated with the peer to peer network may use the certified ML model for real-time decision making.

Figure 5A:
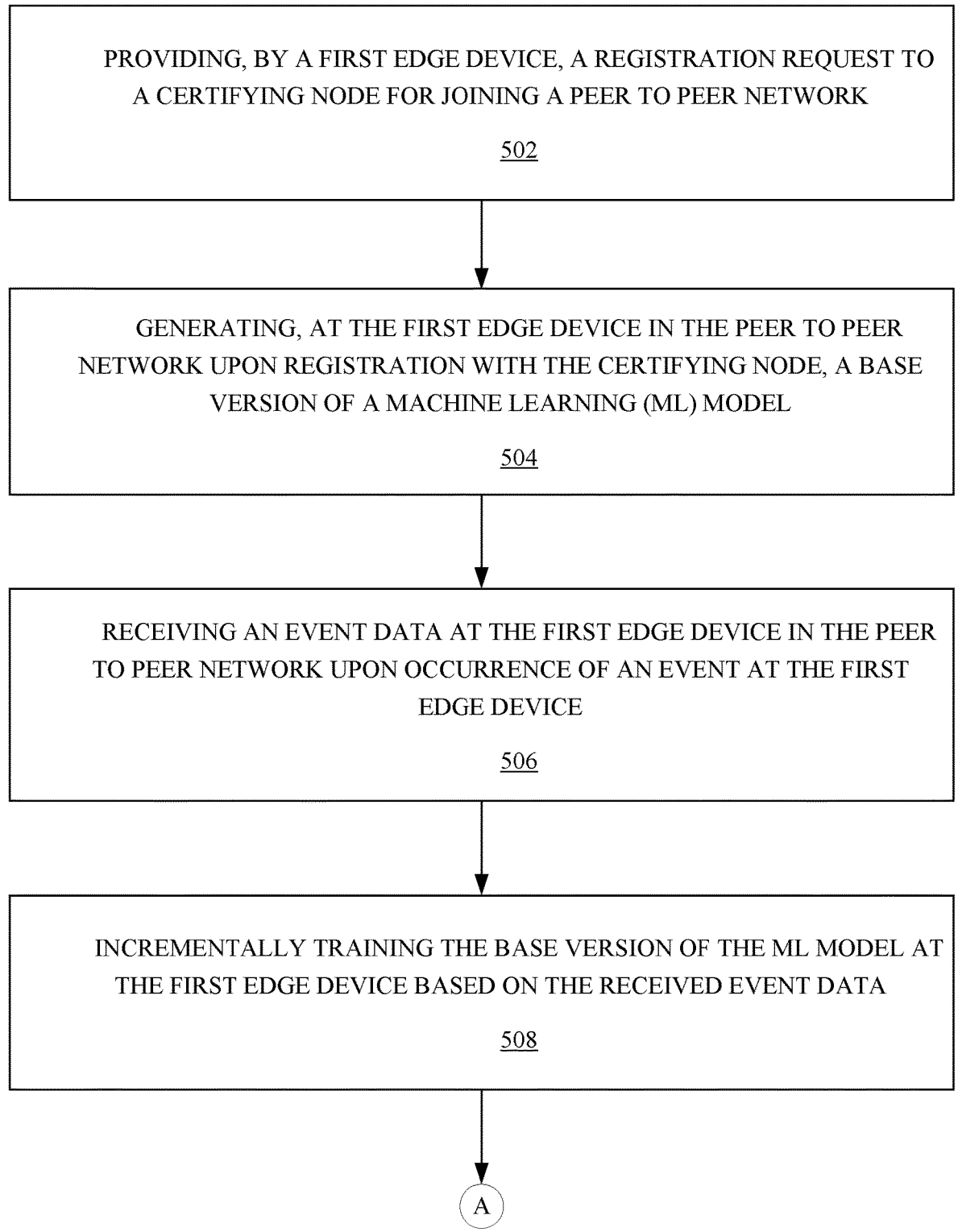
FIGS. 5A and 5B are flow charts that illustrate a method for incremental training of the ML model at the one or more edge devices associated with the peer to peer network for enabling certification at the certification node of FIG. 2, in accordance with the embodiments herein.
Figure 5B:
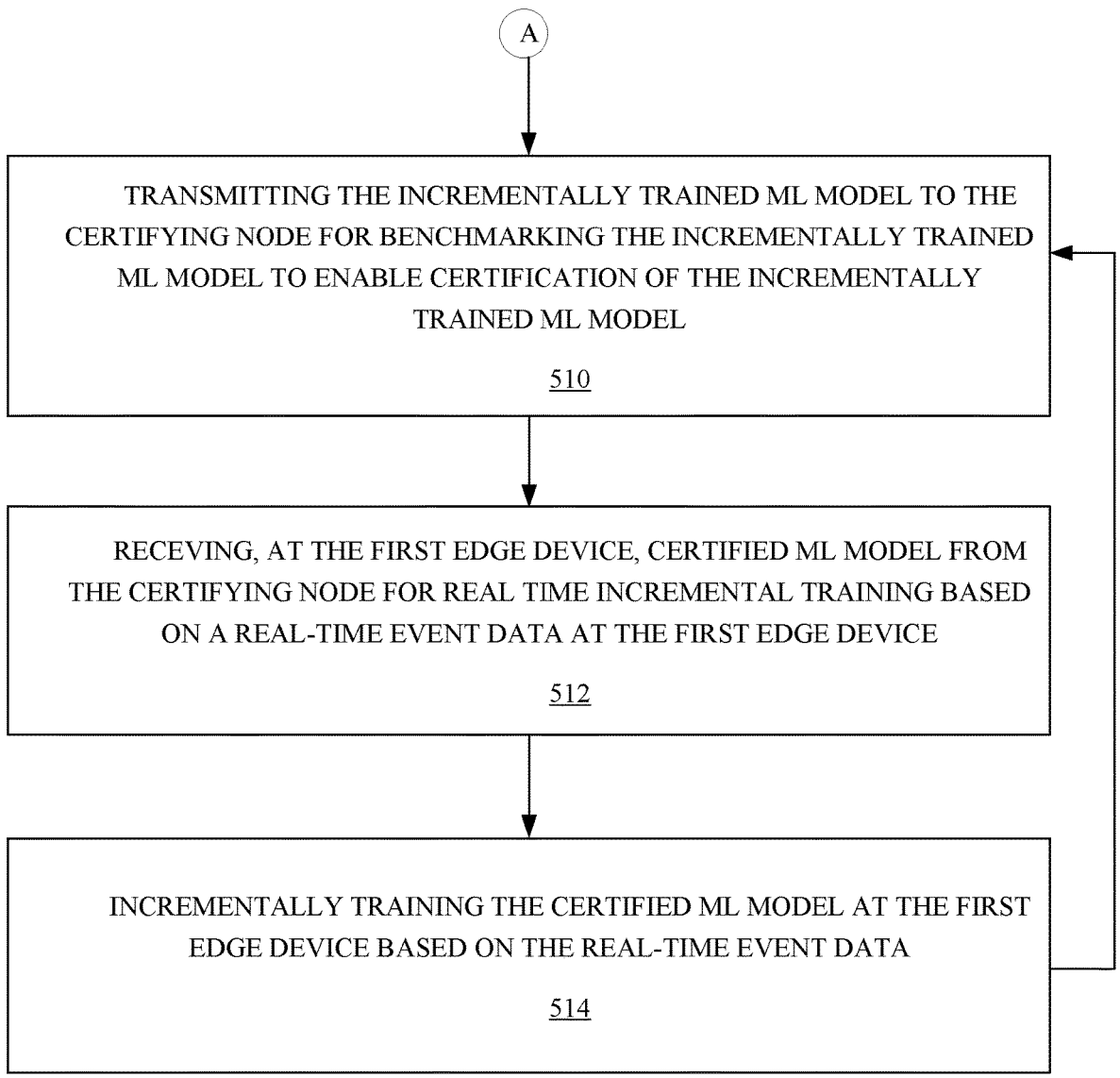

FIGS. 5A and 5B are flow charts that illustrate a method for incremental training of the ML model at the one or more edge devices 102A-N associated with the peer to peer network for enabling certification at the certification node 202 of FIG. 2, in accordance with the embodiments herein. At a step 502, a registration request is provided to the certifying node 202 by the first edge device 102A to join the peer to peer network. At a step 504, a base version of a machine learning (ML) model is generated by the first edge device 102A using the authorized program upon registering with the certifying node 202 in the peer to peer network. In some embodiments, the certifying node 202 registers the first edge device 102A in the peer to peer network by providing the encryption key to the first edge device 102A. In some embodiments, the first edge device 102A generates the base version of the ML model comprising learnings based on data previously seen by other edge devices in the peer to peer network by removing any underlying event data and retaining the one or more parameters and the one or more weights associated with the one or more parameters. In some embodiments, the base version of the ML model is received by the first edge device 102A from the one or more edge devices 102A-N in the peer to peer to network. At a step 506, an event data is received at the first edge device 102A upon occurrence of an event at the first edge device 102A. At a step 508, the base version of the ML model is incrementally trained by the first edge device 102A based on the received event data. The incremental training is performed by updating the one or more weights associated with the one or more parameters of the ML model during a predetermined window of time. At a step 510, the incrementally trained ML model is transmitted, by the first edge device 102A, to the certifying node 202 for evaluating a quality of the incrementally trained machine learning model to enable certification of the incrementally trained ML model. The incrementally trained ML model includes the one or more parameters and the one or more weights associated with the one or more parameters and is devoid of any of the underlying event data that is used to generate the incremental version of the ML model thereby ensuring data security. At a step 512, the certified ML model is received by the first edge device 102A for real time incremental training based on a real-time event data at the first edge device 102A. In some embodiment, the first edge device 102A may use the certified ML model for real-time decision making. In some embodiments, the certifying node 202 may transmit the certified ML model to the one or more edge devices 102A-N associated with the peer to peer network for use in real time incremental training as well as in real-time decision making at the one or more edge devices 102A-N. At a step 514, the certified ML model is incrementally trained at the first edge device 102A based on a real time event data at the first edge device 102A. Subsequently, steps 510 to 514 are repeated to perform certification for incrementally training ML models at the one or more edge devices 102A-N in the peer to peer network in real-time upon occurrence of a data event at each of the one or more edge devices 102A-N.

With reference to FIG. 2, FIG. 6 is a flow chart that illustrates a method of operating the certifying node 202 for certifying an incrementally trained machine learning (ML) model, in accordance with the embodiments herein. The certifying node 202 is configured to be communicatively connected with the one or more edge devices 102A-N of the peer to peer network. At a step 602, the certifying node 202 is configured to generate a predictive outcome value for a test data set by executing a candidate ML model against the test data set available to the certifying node 202. The candidate ML model may be received from the first edge device 102A after the first edge device 102A is registered with the certifying node 202. The candidate ML model may be an incrementally trained ML model. The certifying node 202 is further configured to receive a registration request from the first edge device 102A to register the first edge device 102A to the certifying node 202 and thereafter to provide an encrypted key to the first edge device 102A to authenticate subsequent requests from the first edge device 102A. At a step 604, the certifying node 202 is configured to determine a measure of quality of the candidate ML model by matching the predictive outcome value of the candidate ML model with an actual outcome value of the test data set. At a step 606, the certifying node 202 is configured to certify the candidate ML model by comparing the measure of quality of the candidate ML model against a threshold error value, for use in real time incremental training by the one or more edge devices 102A-N in the peer to peer network. The certified candidate ML model is subsequently incrementally trained by updating one or more parameters and weights associated with parameters by the one or more edge devices 102A-N upon a data event at the respective edge devices. The update to the certified candidate ML model is layered upon the certified candidate ML model. The certifying node 202 maintains a record of a number of data points used by each edge device for incrementally training the candidate ML model to prevent undue contribution by each edge device in incremental training of the candidate ML model.

In some embodiments, the certifying node 202 is configured to verify that each data updated to the candidate ML model is layered on top of a last certified ML model based on an encrypted data that specifies a base model version from which the candidate ML model is derived, to avoid overwriting of the last certified ML model by the first edge device.

The first edge device 102A may incrementally train the last certified machine learning model using an event data upon occurrence of an event at the first edge device 102A to generate the candidate ML model. The first edge device 102A may generate a base version of a ML model for incremental training if there is no last certified machine learning model.

In some embodiments, the certifying node 202 determines the measure of quality of the candidate ML model by (i) comparing the predictive outcome value of the candidate ML model for the test data set with the actual outcome value of the test data set, (ii) squaring difference between the predictive outcome value and the actual outcome value, (iii) averaging squared values, and (iv) computing a square root of averaged squared values as Root Mean Square Error (RMSE) for enabling certification of the candidate ML model. The certifying node 202 may certify the candidate ML model if the RMSE is below the threshold error value and monotonically decreasing or remains constant.

Various embodiments of the present invention prevent joining of rogue, unauthorized edge nodes in a distributed network to avoid contribution of data to the ML models to be used by all the member nodes in the network. Further the embodiments herein prevent undue influence of the edge devices on the ML model, and skewing the ML model based on its training data, versus training data from other edge devices. Likewise, a denial of service (DoS) attack on the distributed system is prevented by the certifying node 202 by declining to accept more than an undue share of inputs from a given edge device.

In an exemplary embodiment, peer to peer network of devices is configured to perform certification for incremental training of machine learning models with patient data at one or more edge devices associated with a peer to peer network.

The patient data may include demographics such as age, gender, and ethnicity, socio-economic data, risk factors such as obesity, high blood pressure and diabetes etc., laboratory data or diagnostic report, treatment data, and clinical outcome with respect to treatment. A first edge device of the peer to peer network of devices may train a first candidate machine learning model with a first patient data associated with the first edge device and may transmit the first candidate machine learning model to a certifying node for certification. The certifying node determines a measure of quality of the first candidate machine learning model based on a predictive outcome value of the first candidate machine learning model on a test data set. The certifying node certifies the first candidate machine learning model if a quality of the first candidate machine learning model is high, monotonic increasing or remains constant. Then, the certifying node transmits a certified first candidate machine learning model to at least one of the first edge device or other edge devices of the one or more edge devices for use in real time incremental training or for use in real time decision making. A second edge device of the peer to peer network of devices may train the certified first candidate machine learning model with a second patient data associated with the second edge device and may transmit a second candidate machine learning model to the certifying node for certification. The certifying node verifies whether data update to the second candidate machine learning model is layered on top of the certified first candidate machine learning model and determines the measure of quality of the second candidate machine learning model for certification. Further, the certifying node may maintain a record of a number of data points that is used by each of the one or more edge devices for incrementally training the candidate machine learning model to prevent undue contribution by each of the one or more edge devices for incremental training of the candidate machine learning model. The certifying node may ensure that net contribution by each of the one or more edge devices is below a threshold value to prevent against undue influence of any of one or more edge devices. The certifying node may prevent a denial of service (DoS) attack by declining to accept more than an undue share of inputs from a given edge device. The candidate machine learning model is devoid of the patient data is used to train the candidate machine learning model incrementally. Rather, the candidate machine learning model include one or more parameters and one or more weights associated with the parameters.

In an exemplary embodiment, the peer to peer network of devices is configured to perform certification for incremental training of machine learning models with user data of one or more applications at one or more edge devices. Incrementally trained machine learning models may be used for targeting audiences to deliver "application install advertising". A certifying node of the peer to peer network of devices certifies the incrementally trained machine learning models by ensuring its quality.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
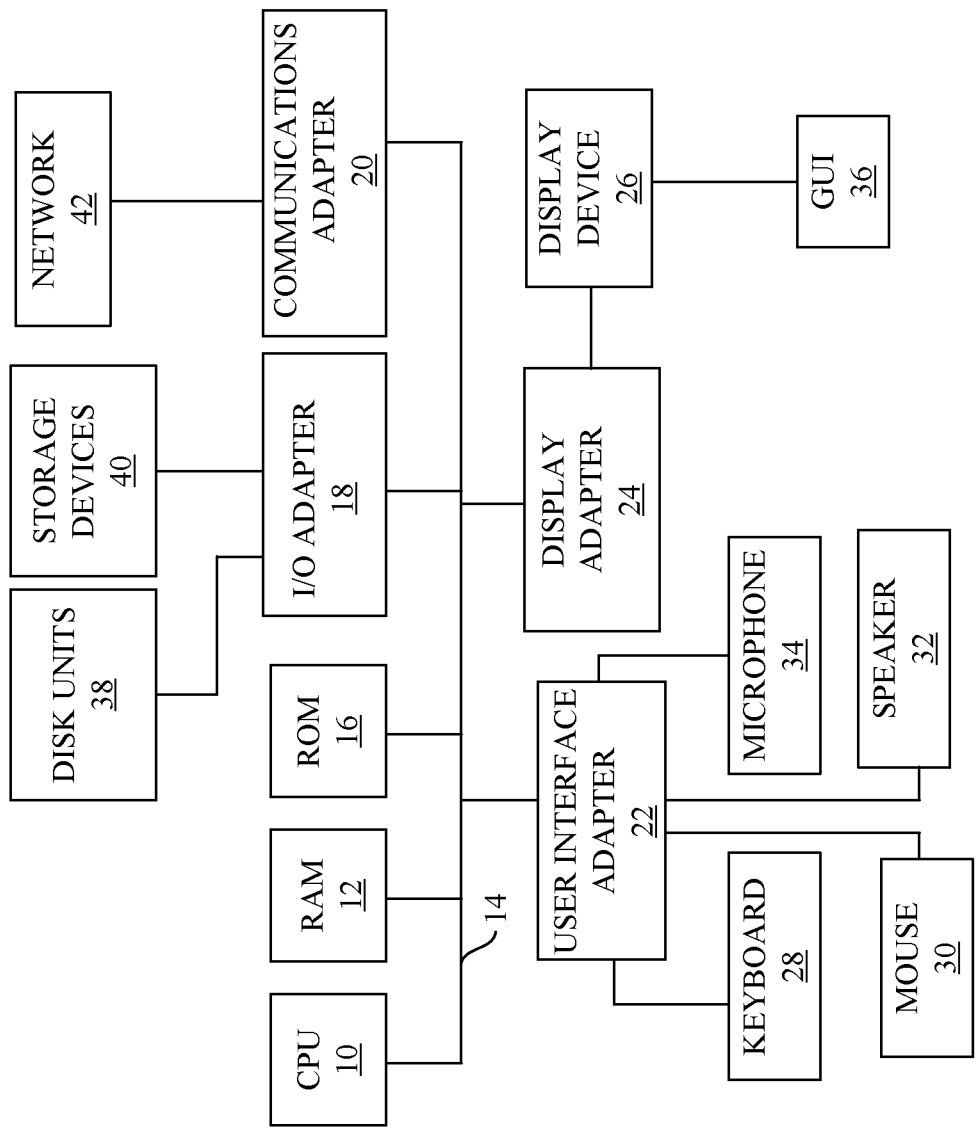
FIG. 7 illustrates an exploded view of a certifying node and/or an edge device configured to perform any one or more of the methodologies herein, in accordance with an embodiment.

FIG. 7 illustrates an exploded view of a certifying node and/or an edge device configured to perform any one or more of the methodologies herein, in accordance with an embodiment. A representative hardware environment for practicing the embodiments herein is depicted in FIG. 7, with reference to FIGS. 2 through 6. This schematic drawing illustrates a hardware configuration of a server/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A certifying node for certifying one or more incrementally trained machine learning (ML) models that are generated by one or more edge devices, by evaluating quality of the one or more incrementally trained ML models, wherein the certifying node is configured to be communicatively connected with the one or more edge devices in a peer to peer network, wherein the certifying node comprises:
   a processor; and
   a memory that stores a set of instructions, which when executed by the processor, performs a method comprising:
   generating a predictive outcome value for a test data set by executing a candidate ML model against the test data set available to the certifying node, wherein the candidate ML model is received from a first edge device of the one or more edge devices in the peer to peer network, after the first edge device is registered with the certifying node, wherein the first edge device generates the candidate ML model, wherein the candidate ML model is an incrementally trained ML model at the first edge device;
   determining a measure of quality of the candidate ML model by matching the predictive outcome value of the candidate ML model with an actual outcome value of the test data set;
   verifying that each training data updated, by the first edge device, to the candidate ML model is layered over a last certified ML model based on encrypted data, wherein the encrypted data specifies a base model version from which the candidate ML model is derived, wherein the last certified ML model constitutes the base model version, wherein the last certified ML model comprises learnings based on data previously seen by other edge devices in the peer to peer network; and
   certifying, after verification of the updated training data, the candidate ML model if the measure of quality of the candidate ML model is below a threshold error value by comparing the measure of quality of the candidate ML model against the threshold error value, for use in real time incremental training or for use in real-time decision making by the one or more edge devices in the peer to peer network;
   wherein the certifying node is further configured to receive a registration request from the first edge device to register the first edge device to the certifying node and thereafter to provide an encrypted key to the first edge device to authenticate subsequent requests from the first edge device.

2. The certifying node of claim 1, wherein the first edge device incrementally trains the last certified ML model using an event data upon occurrence of an event at the first edge device to generate the candidate ML model.

3. The certifying node of claim 2, wherein the first edge device generates a base version of a ML model for incremental training if there is no last certified ML model.

4. The certifying node of claim 2, wherein the candidate ML model comprises one or more parameters and one or more weights associated with the one or more parameters, wherein the candidate ML model is devoid of the event data that is used to generate the candidate ML model.

5. The certifying node of claim 1, wherein the certifying node is further configured to transmit a certified ML model to at least one of the first edge device or the other edge devices of the peer to peer network, wherein the certified ML model is subsequently incrementally trained by updating one or more parameters and weights associated with the one or more parameters by the one or more edge devices upon a data event at the respective edge devices or used in real-time decision making at the one or more edge devices.

6. The certifying node of claim 1, wherein the certifying node determines the measure of quality of the candidate ML model by (i) comparing the predictive outcome value of the candidate ML model for the test data set with the actual outcome value of the test data set, (ii) squaring a difference between the predictive outcome value and the actual outcome value, (iii) averaging squared values, and (iv) computing a square root of averaged squared values as Root Mean Square Error (RMSE) for enabling the certification of the candidate ML model.

7. The certifying node of claim 6, wherein the certifying node certifies the candidate ML model if the RMSE is below the threshold error value and monotonically decreasing or remains constant.

8. The certifying node of claim 1, wherein the certifying node is further configured to prevent undue contribution by each of the one or more edge devices for incremental training of the candidate ML model by declining to accept more than an undue share of inputs from a given edge device, wherein the certifying node maintains a record of a number of data points that is used by each of the one or more edge devices for incrementally training the candidate ML model to prevent undue contribution by each of the one or more edge devices.

9. A processor implemented method of operating a certifying node for certifying one or more incrementally trained machine learning (ML) models that are generated by one or more edge devices, by evaluating quality of the one or more incrementally trained ML models, wherein the certifying node is configured to be communicatively connected with the one or more edge devices of a peer to peer network, wherein the processor implemented method comprises configuring the certifying node to:
   generate a predictive outcome value for a test data set by executing a candidate ML model against the test data set available to the certifying node, wherein the candidate ML model is received from a first edge device of the one or more edge devices in the peer to peer network, after the first edge device is registered with the certifying node, wherein the first edge device generates the candidate ML model, wherein the candidate ML model is an incrementally trained ML model at the first edge device;
   determine a measure of quality of the candidate ML model by matching the predictive outcome value of the candidate ML model with an actual outcome value of the test data set;
   verify that each training data updated, by the first edge device, to the candidate ML model is layered over on top of a last certified ML model based on encrypted data, wherein the encrypted data specifies a base model version from which the candidate ML model is derived, wherein the last certified ML model constitutes as the base model version, wherein the last certified ML model comprises learnings based on data previously seen by other edge devices in the peer to peer network; and certify, after verification of the updated training data, the candidate ML model if the measure of quality of the candidate ML model is below a threshold error value by comparing the measure of quality of the candidate ML model against the threshold error value, for use in real time incremental training or for use in real-time decision making by the one or more edge devices in the peer to peer network;

wherein the certifying node is further configured to receive a registration request from the first edge device to register the first edge device to the certifying node and thereafter to provide an encrypted key to the first edge device to authenticate subsequent requests from the first edge device.

10. The processor implemented of claim 9, wherein the first edge device incrementally trains the last certified ML model using an event data upon occurrence of an event at the first edge device to generate the candidate ML model, wherein the first edge device generates a base version of a ML model for incremental training if there is no last certified ML model.

11. The processor implemented of claim 10, wherein the candidate ML model comprises one or more parameters and one or more weights associated with the one or more parameters, wherein the candidate ML model is devoid of the event data that is used to generate the candidate ML model.

12. The processor implemented of claim 9, wherein the method further comprises configuring the certifying node to transmit a certified ML model to at least one of the first edge device or other edge devices of the peer to peer network, wherein the certified ML model is subsequently incrementally trained by updating one or more parameters and weights associated with parameters by the one or more edge devices upon a data event at the respective edge devices or used in real-time decision making at the one or more edge devices.

13. The processor implemented of claim 9, wherein the certifying node determines the measure of quality of the candidate ML model by (i) comparing the predictive outcome value of the candidate ML model for the test data set with the actual outcome value of the test data set; (ii) squaring difference between the predictive outcome value and the actual outcome value; (iii) averaging squared values; and (iv) computing a square root of averaged squared values as Root Mean Square Error (RMSE) for enabling certification of the candidate ML model.

14. The processor implemented of claim 13, wherein the certifying node certifies the candidate ML model if the RMSE is below the threshold error value and monotonically decreasing or remains constant.

15. The processor implemented of claim 9, wherein the method further comprises configuring the certifying node to prevent undue contribution by each of the one or more edge devices for incremental training of the candidate ML model by declining to accept more than an undue share of inputs from a given edge device, wherein the certifying node maintain a record of a number of data points that is used by each of the one or more edge devices for incrementally training the candidate ML model to prevent undue contribution by each of the one or more edge devices.

16. A computer program product comprising a non-transitory computer-readable storage medium having computer-readable instructions stored thereon, computer-readable instructions being executable by a computerized device comprising processing hardware to execute a method of operating a certifying node for certifying one or more incrementally trained machine learning (ML) models that are generated by one or more edge devices, by evaluating quality of the one or more incrementally trained ML models, wherein the certifying node is configured to be communicatively connected with the one or more edge devices of a peer to peer network, wherein the method comprises configuring the certifying node to:

generate a predictive outcome value for a test data set by executing a candidate ML model against the test data set available to the certifying node, wherein the candidate ML model is received from a first edge device of the one or more edge devices in the peer to peer network, after the first edge device is registered with the certifying node, wherein the first edge device generates the candidate ML model, wherein the candidate ML model is an incrementally trained ML model at the first edge device;

determine a measure of quality of the candidate ML model by matching the predictive outcome value of the candidate ML model with an actual outcome value of the test data set;

verify that each training data updated, by the first edge device, to the candidate ML model is layered over on top of a last certified ML model based on encrypted data, wherein the encrypted data specifies a base model version from which the candidate ML model is derived, wherein the last certified ML model constitutes the base model version, wherein the last certified ML model comprises learnings based on data previously seen by other edge devices in the peer to peer network; and certify, after verification of the updated training data, the candidate ML model if the measure of quality of the candidate ML model is below a threshold error value by comparing the measure of quality of the candidate ML model against the threshold error value, for use in real time incremental training or for use in real-time decision making by the one or more edge devices in the peer to peer network;

wherein the certifying node is further configured to receive a registration request from the first edge device to register the first edge device to the certifying node and thereafter to provide an encrypted key to the first edge device to authenticate subsequent requests from the first edge device.

* * * * *